United States Patent
Lecoeuche

(10) Patent No.: US 10,876,925 B2
(45) Date of Patent: *Dec. 29, 2020

(54) BRILLOUIN AND RAYLEIGH DISTRIBUTED SENSOR

(71) Applicant: VIAVI SOLUTIONS INC., San Jose, CA (US)

(72) Inventor: Vincent Lecoeuche, Tarentaise (FR)

(73) Assignee: VIAVI SOLUTIONS INC., San Jose, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/059,837

(22) Filed: Aug. 9, 2018

(65) Prior Publication Data

US 2018/0348086 A1    Dec. 6, 2018

Related U.S. Application Data

(63) Continuation of application No. 15/130,287, filed on Apr. 15, 2016, now Pat. No. 10,073,006.

(51) Int. Cl.
*G01M 11/00* (2006.01)
*G01D 5/353* (2006.01)
*G01K 11/32* (2006.01)

(52) U.S. Cl.
CPC ..... *G01M 11/3181* (2013.01); *G01D 5/35358* (2013.01); *G01D 5/35361* (2013.01);
(Continued)

(58) Field of Classification Search
CPC ......... G01M 11/3181; G01M 11/3172; G01M 11/3127; G01D 5/35364; G01D 5/35361; G01D 5/35358; G01K 2011/322
See application file for complete search history.

(56) References Cited

U.S. PATENT DOCUMENTS 5,173,743 A * 12/1992 Kim ............... G01D 5/344
250/227.19
5,363,463 A    11/1994 Kleinerman
(Continued)

FOREIGN PATENT DOCUMENTS

JP    S63313030    12/1988
JP    H0331736 A    2/1991
(Continued)

OTHER PUBLICATIONS

Froggatt, Mark et al., "High-Spatial-Resolution Distributed Strain Measurement in Optical Fiber with Rayleigh Scatter", ResearchGate, article in Applied Optics, May 1998, 7 pages.
(Continued)

*Primary Examiner* — Mohamed K Amara
(74) *Attorney, Agent, or Firm* — Mannava & Kang, P. C.

(57) ABSTRACT

According to examples, a Brillouin and Rayleigh distributed sensor may include a first laser source to emit a first laser beam, and a second laser source to emit a second laser beam. A photodiode may acquire a beat frequency between the two laser beams. The beat frequency may be used to maintain a predetermined offset frequency shift between the two laser beams. A modulator may modulate the first laser beam. The modulated first laser beam is to be injected into a device under test (DUT), A coherent receiver may acquire a back-scattered signal from the DUT. The backscattered signal results from the modulated first laser beam injected into the DUT. The coherent receiver may use the second laser beam as a local oscillator to determine Brillouin and Rayleigh traces with respect to the DUT based on the predetermined offset frequency shift.

14 Claims, 7 Drawing Sheets

(52) U.S. Cl.
CPC ..... *G01D 5/35364* (2013.01); *G01M 11/3127* (2013.01); *G01M 11/3172* (2013.01); *G01K 2011/322* (2013.01)

(56) References Cited

U.S. PATENT DOCUMENTS

| | | | |
|---|---|---|---|
| 5,686,986 A | 11/1997 | Li et al. | |
| 5,696,863 A * | 12/1997 | Kleinerman | F25B 23/003 250/227.11 |
| 5,751,413 A | 5/1998 | Chung et al. | |
| 5,991,479 A * | 11/1999 | Kleinerman | G01J 5/0821 385/31 |
| 6,055,044 A | 4/2000 | Uchiyama et al. | |
| 6,067,391 A * | 5/2000 | Land | G02B 6/02085 385/27 |
| 6,380,534 B1 | 4/2002 | Farhadiroushan et al. | |
| 6,407,846 B1 * | 6/2002 | Myers | G02F 2/00 359/239 |
| 6,542,228 B1 | 4/2003 | Hartog | |
| 6,571,027 B2 * | 5/2003 | Cooper | G01D 5/35383 250/227.19 |
| 6,680,472 B1 * | 1/2004 | Thingbo | G01J 9/00 250/227.12 |
| 7,126,680 B2 | 10/2006 | Yamate et al. | |
| 7,154,082 B2 * | 12/2006 | Maas | G01H 9/004 250/227.18 |
| 7,355,163 B2 * | 4/2008 | Watley | E21B 47/102 250/227.14 |
| 7,397,543 B2 * | 7/2008 | Nebendahl | G01M 11/3172 356/73.1 |
| 7,499,151 B2 | 3/2009 | Bao et al. | |
| 7,746,480 B2 * | 6/2010 | Ozcan | G02B 6/0208 356/519 |
| 7,859,654 B2 | 12/2010 | Hartog | |
| 8,379,217 B2 * | 2/2013 | Koste | G01D 5/35312 356/478 |
| 8,505,625 B2 * | 8/2013 | Ravi | E21B 33/14 166/250.14 |
| 8,699,009 B2 | 4/2014 | Li et al. | |
| 9,116,119 B2 * | 8/2015 | Le Floch | G01D 5/35364 |
| 9,170,149 B2 * | 10/2015 | Hartog | E21B 41/00 |
| 9,267,821 B2 * | 2/2016 | Childers | G01D 5/35316 |
| 9,322,721 B2 * | 4/2016 | Kwon, II | G01K 11/32 |
| 9,360,304 B2 * | 6/2016 | Xue | G01V 8/16 |
| 9,366,526 B2 * | 6/2016 | Yamauchi | G01D 5/35358 |
| 9,726,546 B2 | 8/2017 | Cedilnik et al. | |
| 9,739,645 B2 * | 8/2017 | Hill | G01D 5/35348 |
| 9,804,001 B2 * | 10/2017 | Nikles | G01K 11/32 |
| 9,823,098 B2 * | 11/2017 | Bastianini | H01S 3/302 |
| 9,829,352 B2 * | 11/2017 | Xue | G01K 11/32 |
| 9,983,069 B2 * | 5/2018 | Koizumi | G01K 11/32 |
| 9,983,094 B2 * | 5/2018 | Lecoeuche | G01D 5/35361 |
| 10,028,667 B2 * | 7/2018 | Kishida | G01K 13/002 |
| 10,036,672 B2 * | 7/2018 | Iwamura | G01L 1/242 |
| 10,359,302 B2 * | 7/2019 | Hartog | G01D 5/35364 |
| 2003/0234921 A1 * | 12/2003 | Yamate | G01K 11/32 356/73.1 |
| 2006/0018586 A1 * | 1/2006 | Kishida | G01B 11/16 385/12 |
| 2010/0014071 A1 | 1/2010 | Hartog | |
| 2011/0090936 A1 | 4/2011 | Kupershmidt | |
| 2011/0228255 A1 | 9/2011 | Li et al. | |
| 2012/0302862 A1 | 11/2012 | Yun et al. | |
| 2013/0020486 A1 | 1/2013 | Zhang et al. | |
| 2013/0093598 A1 | 4/2013 | Duncan et al. | |
| 2013/0265569 A1 * | 10/2013 | Le Floch | G01D 5/35364 356/73.1 |
| 2013/0271769 A1 * | 10/2013 | Handerek | E21B 47/06 356/446 |
| 2014/0083197 A1 | 3/2014 | Zadok et al. | |
| 2014/0152982 A1 * | 6/2014 | Gosteli | G01M 11/085 356/300 |
| 2014/0183360 A1 | 7/2014 | Rao et al. | |
| 2015/0003834 A1 * | 1/2015 | Shan | G01D 5/35364 398/116 |
| 2015/0168253 A1 * | 6/2015 | Chin | G01M 11/083 356/73.1 |
| 2015/0308923 A1 | 10/2015 | Chin | |
| 2016/0011018 A1 * | 1/2016 | Holland | G01K 11/32 356/73.1 |
| 2016/0025524 A1 * | 1/2016 | Nikles | G01K 11/32 356/73.1 |
| 2016/0204571 A1 | 7/2016 | Wu et al. | |
| 2016/0258788 A1 | 9/2016 | Gruner-Nielsen et al. | |
| 2017/0010385 A1 | 1/2017 | Englich et al. | |
| 2017/0059428 A1 * | 3/2017 | Hill | G01L 1/242 |
| 2017/0082535 A1 | 3/2017 | Logunov et al. | |
| 2017/0115110 A1 | 4/2017 | Pelivanov et al. | |
| 2018/0045543 A1 * | 2/2018 | Farhadiroushan | G01H 9/004 |
| 2018/0188077 A1 * | 7/2018 | Ronnekleiv | G01D 5/35316 |

FOREIGN PATENT DOCUMENTS

| | | |
|---|---|---|
| JP | H05240699 | 9/1993 |
| JP | H1123419 | 1/1999 |
| JP | 2001050718 A | 2/2001 |
| WO | 2011/022829 | 3/2011 |

OTHER PUBLICATIONS

P.C.Wait and T.P.Newson, "Landau Placzek Ratio, Applied to Distributed Fibre Sensing", University of Southampton, United Kingdom, 1996, 17 pages.

Froggatt, Mark et al., "Distributed Strain and Temperature Discrimination in Unaltered Polarization Maintaining Fiber", Luna Technologies, Aug. 22, 2012.

Koyamada, Yahei et al., "Novel Fiber-Optic Distributed Strain and Temperature Sensor with Very High Resolution", IEICE Trans. Commun., vol. E89-B, No. 5 May 2006, 4 pages.

Parker, T.R., et al., "A Fully Distributed Simultaneous Strain and Temperature Sensor using Spontaneous Brillouin Backscatter", IEEE Photonics Technology Letters, vol. 9, No. 7, Jul. 1997, 3 pages.

Parker, T.R., et al., "Simultaneous Distributed Measurement of Strain and Temperature from Noise-Initiated Brillouin Scattering in Optical Fibers", IEEE Journal of Quantum Electronics, vol. 34, No. 4, Apr. 1998, 15 pages.

V. Lecoeuche, et al., "20-km Distributed Temperature Sensor Based on Spontaneous Brillouin Scattering", IEEE Photonics Technology Letters, vol. 12, No. 10, Oct. 2000, 3 pages.

Tomasz Kawalec et al., "Construction and performance of an optical phase and frequency lock of diode lasers", Optical Engineering, vol. 52, No. 12, Dec. 16, 2013, 126105, 8 pages.

* cited by examiner

300

```
┌─────────────────────────────────────────────────────────────────┐
│  MAINTAIN A PREDETERMINED OFFSET FREQUENCY SHIFT BETWEEN A      │
│         FIRST LASER BEAM AND A SECOND LASER BEAM                │
│                              302                                │
└─────────────────────────────────────────────────────────────────┘
                                │
                                ▼
┌─────────────────────────────────────────────────────────────────┐
│                   MODULATE THE FIRST LASER BEAM                 │
│                              304                                │
└─────────────────────────────────────────────────────────────────┘
                                │
                                ▼
┌─────────────────────────────────────────────────────────────────┐
│            ACQUIRE A BACKSCATTERED SIGNAL FROM THE DUT          │
│                              306                                │
└─────────────────────────────────────────────────────────────────┘
                                │
                                ▼
┌─────────────────────────────────────────────────────────────────┐
│  DETERMINE, BASED ON THE ACQUIRED BACKSCATTERED SIGNAL FROM     │
│         THE DUT, A BRILLOUIN TRACE FOR THE DUT                  │
│                              308                                │
└─────────────────────────────────────────────────────────────────┘
```

```
┌─────────────────────────────────────────────────────────────┐
│ SCAN A FIRST LASER BEAM AND A SECOND LASER BEAM OVER A      │
│ WAVELENGTH RANGE WITH A PREDETERMINED OFFSET FREQUENCY      │
│         SHIFT BETWEEN THE TWO LASER BEAMS                   │
│                          402                                │
└─────────────────────────────────────────────────────────────┘
                              │
                              ▼
┌─────────────────────────────────────────────────────────────┐
│                 MODULATE THE FIRST LASER BEAM               │
│                             404                             │
└─────────────────────────────────────────────────────────────┘
                              │
                              ▼
┌─────────────────────────────────────────────────────────────┐
│           ACQUIRE A BACKSCATTERED SIGNAL FROM THE DUT       │
│                             406                             │
└─────────────────────────────────────────────────────────────┘
                              │
                              ▼
┌─────────────────────────────────────────────────────────────┐
│   DETERMINE, BASED ON THE ACQUIRED BACKSCATTERED SIGNAL     │
│         FROM THE DUT, A RAYLEIGH TRACE FOR THE DUT          │
│                             408                             │
└─────────────────────────────────────────────────────────────┘
```

FIG. 4

BRILLOUIN AND RAYLEIGH DISTRIBUTED SENSOR

PRIORITY

This application is a Continuation of commonly assigned and co-pending U.S. patent application Ser. No. 15/130,287, filed Apr. 15, 2016, the disclosure of which is hereby incorporated by reference in its entirety.

BACKGROUND

In optical fibers, loss mechanisms of light transmission may include light absorption and scattering. With respect to absorption, light may be absorbed in optical fiber material as the energy of the light is converted to heat. With respect to scattering, light energy may be dispersed in a variety of directions as the light travels through an optical fiber, with some of the light energy being returned down the core of the optical fiber. In this regard, Brillouin scattering occurs when light passing through a transparent medium interacts with that medium's periodic spatial and temporal variations producing that medium's refractive index. Brillouin scattering, which is dependent on environmental variables such as strain and temperature, may be used to sense mechanical strain and temperature in optical fibers. Compared to Brillouin scattering, Rayleigh scattering pertains to the elastic scattering of light or other electromagnetic radiation by particles. Rayleigh scattering may be used to identify anomalies in transmission of a signal along an optical fiber.

BRIEF DESCRIPTION OF DRAWINGS

Features of the present disclosure are illustrated by way of examples shown in the following figures. In the following figures, like numerals indicate like elements, in which:

FIG. 3 illustrates a flowchart of a method for Brillouin trace and Rayleigh trace determination, according to an example of the present disclosure;

FIG. 4 illustrates another flowchart of a method for Brillouin trace and Rayleigh trace determination, according to an example of the present disclosure.

DETAILED DESCRIPTION

Figure 1:
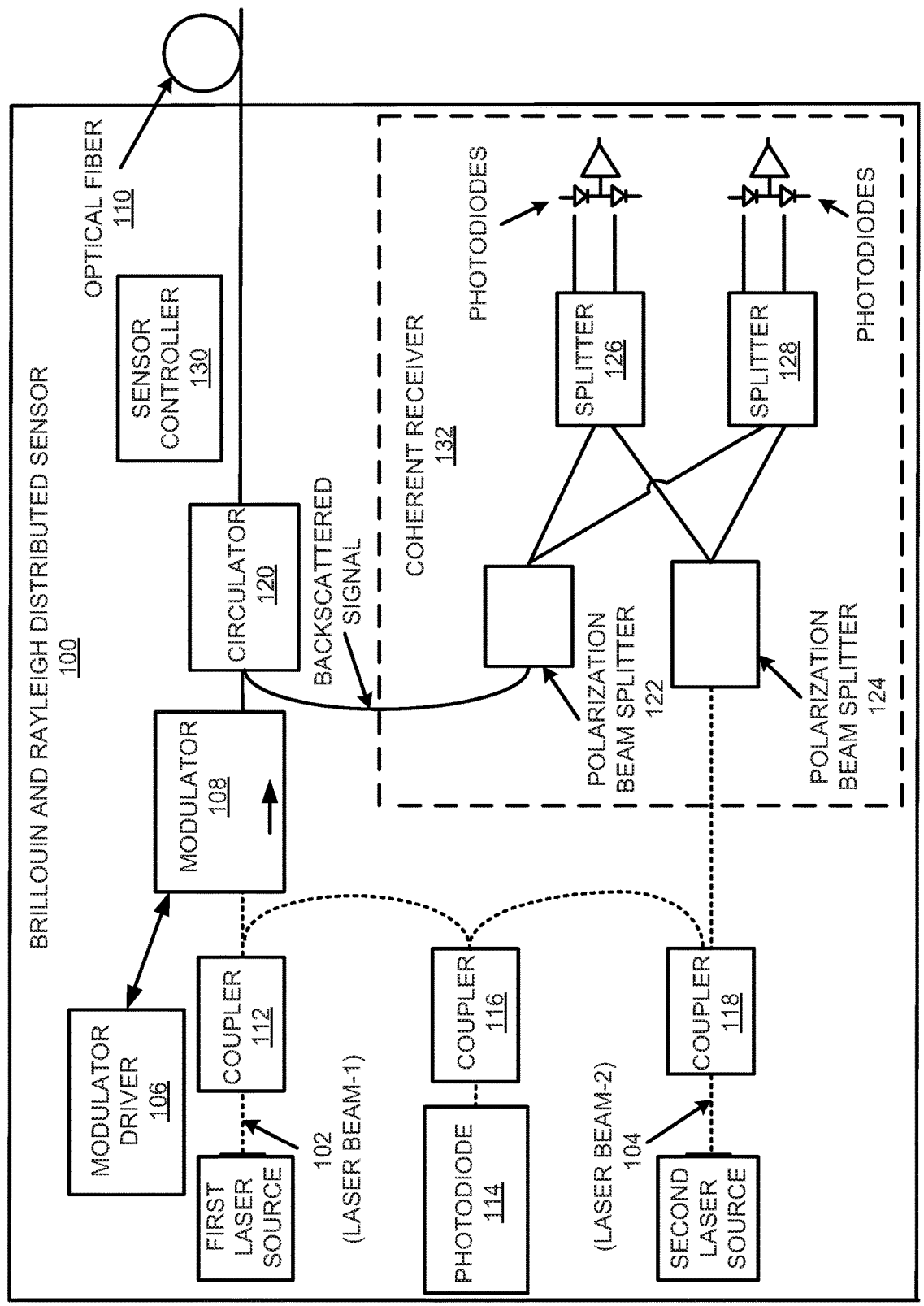
FIG. 1 illustrates an architecture of a Brillouin and Rayleigh distributed sensor, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, a Brillouin and Rayleigh distributed sensor may include a pair of tunable laser sources and a semiconductor optical amplifier (SOA). By tuning the laser sources to include a predetermined offset frequency shift, the sensor may be used to determine both Brillouin and Rayleigh traces for an optical fiber. The Brillouin and Rayleigh distributed sensor may be applied to both an optical time-domain reflectometer (OTDR) and a Brillouin OTDR (B-OTDR). The Brillouin and Rayleigh distributed sensor may provide for Brillouin and Rayleigh coherent reflectometry.

An optical amplifier (OA) may amplify an optical signal directly, without the need to first convert the optical signal to an electrical signal. An SOA is a type of OA based on a semiconductor gain medium. The SOA may provide for high optical gain with respect to an optical signal over a wide wavelength range.

An optical time-domain reflectometer (OTDR) is an optoelectronic instrument used to characterize an optical fiber. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate and measure events at any location of the optical fiber. The events may include faults at any location of the optical fiber. Other types of features that may be measured by the OTDR include attenuation uniformity and attenuation rate, segment length, and location and insertion loss of connectors and splices.

A B-OTDR may be described as a fiber optic strain and temperature distributed sensing system which can measure strain and temperature along different regions of an optical fiber.

With respect to an OTDR, coherent OTDR methods typically use a single narrow laser beam and a frequency shifter in the form of an Acousto Optic Modulator (AOM) or an Electro Optic Modulator (EOM) to create an heterodyne beat frequency. An AOM may use the acousto-optic effect to diffract and shift the frequency of light using sound waves. An EOM may include a signal-controlled element exhibiting the electro-optic effect, where the signal-controlled element is used to modulate a beam of light.

With respect to the AOM and the EOM, when a frequency scan is applied, the shifted laser beam directly follows the single laser beam, maintaining a constant beat frequency. However, coherent OTDR techniques that utilize a single narrow laser beam and a frequency shifter include drawbacks, which add complexity to B-OTDR implementations. For example, the AOM cannot produce a frequency shift matching the Brillouin frequency shift of approximately 10.8 GHz. The EOM output comports many lines, the fundamental, sidebands, and harmonics, which can be minimized, but still generate undesirable signals and Brillouin interactions. Further, the AOM and the EOM may include from 2 dB to 5 dB insertion loss with respect to insertion of the AOM or EOM at the laser source.

According to examples of the present disclosure, the Brillouin and Rayleigh distributed sensor may provide for both OTDR and B-OTDR implementations. Further, the Brillouin and Rayleigh distributed sensor may provide for both Brillouin and Rayleigh trace determination with respect to an optical fiber.

With respect to Brillouin trace determination, a controlled frequency shift between two laser beams may be maintained for the Brillouin and Rayleigh distributed sensor. According to an example, the range of the offset frequency shift for the Brillouin trace determination may include frequencies between approximately 10.0 GHz to approximately 13 GHz. For example, the two laser beams may be set with an approximately 10.8 GHz offset frequency shift. A first laser beam of the two laser beams may be modulated with an external modulator. The modulated laser beam may be injected into a Device Under Test (DUT). For example, the DUT may include an optical fiber. A backscattered signal from the DUT may be acquired by a coherent receiver. At the coherent receiver, the backscattered signal may be mixed with a second laser beam that is used as a local oscillator. With respect to use of the second laser beam as a local oscillator, the relatively low amplitude backscattered signal associated with the first laser beam may be mixed with a relatively high amplitude signal of the second laser beam at the coherent receiver. The coherent receiver may be a polarization diversity coherent receiver. A sensor controller may be communicatively connected to each of the components of the Brillouin and Rayleigh distributed sensor to control operations of the components. The sensor controller may perform various functions as disclosed herein with respect to Brillouin trace determination. For example, the sensor controller may repeat the acquisitions for various frequency shifts between the two laser beams in order to sample the distributed Brillouin spectra. Brillouin interaction in the DUT shifts the backscattered signal in frequency with respect to the original probe pulse. The frequency shift value is a quantity close to plus or minus 10.8 GHz, for an anti-Stokes or Stokes interaction respectively. Stokes shift may be described as the negative frequency shift observable when an optical wave is backscattered by a co-propagating acoustic, wave, a phenomenon generally assimilated to a Doppler effect. A positive—namely anti-Stokes—frequency shift occurs when an optical wave is backscattered by a counter-propagating acoustic wave. By setting and tuning the frequency shift between the two laser sources, a coherent detection around zero frequencies, allows the recording of the distributed Brillouin spectra. The resonant Brillouin frequency shift along the DUT may be determined from analysis of the Brillouin trace, for example, by fitting of the Brillouin spectra. Further, the integrated Brillouin power may be determined, for example, by performing an integration operation with respect to the resonant Brillouin frequency shift. The Brillouin frequency shift and the integrated Brillouin power may be used to sense mechanical strain and temperature in the DUT.

With respect to Rayleigh trace determination, the Brillouin and Rayleigh distributed sensor may scan the two laser beams over a wavelength range with a maintained frequency shift between the two laser beams. For example, the two laser beams may be set with an offset frequency shift. According to an example, the range of the offset frequency shift for the Rayleigh trace determination may include frequencies between approximately 100.0 KHz to approximately 1 GHz. For example, the offset frequency shift may be set at approximately 240 MHz. According to an example, the wavelength range may include a range of 10's of GHz (e.g., 15 GHz) to several THz (e.g., 50 THz). The first laser beam may be modulated with an external modulator. The modulated laser beam may be injected into the DUT. For example, the DUT may include an optical fiber. A backscattered signal from the DUT may be acquired by the coherent receiver. The backscattered signal may be mixed with the second laser beam that is used as a local oscillator. The sensor controller may perform various functions as disclosed herein with respect to Rayleigh trace determination. For example, the sensor controller may perform averaging of repeated acquisitions while scanning the two laser beams in order to reduce coherent fading noises. The coherent detection at the predetermined offset frequency shift yields the Rayleigh trace. The Rayleigh trace may be used to identify anomalies in transmission of a signal along the DUT.

FIG. 1 illustrates an architecture of a Brillouin and Rayleigh distributed sensor 100 (hereinafter referred to as "sensor 100"), according to an example of the present disclosure. Referring to FIG. 1, the sensor 100 may include a first laser source that emits a first laser beam at 102 and a second laser source that emits a second laser beam at 104. The first laser beam and the second laser beam may be respectively designated as Laser Beam-1 and Laser Beam-2. Each of the laser sources may be a distributed feedback (DFB) laser source. A DFB laser source may be described as an optical fiber laser source where the active region of the laser source is periodically structured as a diffraction grating.

A modulator driver 106 may drive a modulator 108. The modulator 108 may modulate the Laser Beam-1. The modulator 108 may be an external modulator. Examples of the modulator 108 include an SOA, an AOM, or an EOM. The modulator 108 may modulate the Laser Beam-1, for example, between a range of 10 ns to 1 µs. The modulator 108 may be intermediately disposed between the Laser Beam-1 and an optical fiber 110. The modulator 108 may provide for amplification of the optical signal from a coupler 112. That is, the modulator 108 may provide high optical gain with respect to the optical signal from the coupler 112 over a wide wavelength range.

A photodiode 114 may be connectively disposed between the Laser Beam-1 and the Laser Beam-2. The photodiode 114 may measure the frequency of the beat between the Laser Beam-1 and the Laser Beam-2. The frequency of the beat between the Laser Beam-1 and the Laser Beam-2 may be used to set a predetermined offset frequency shift between the Laser Beam-1 and the Laser Beam-2. With respect to the predetermined offset frequency shift, the photodiode 114 may provide a signal proportional to the intensity of an optical field. The optical field may be composed of two monochromatic optical signals in the same linearly polarized state, with a frequency difference between the Laser Beam-1 and the Laser Beam-2 within the response bandwidth of the photodiode 114. The two field interferences may produce a beat frequency at this frequency, which is observable in the output signal of the photodiode 114.

Couplers 112, 116, and 118 may be connected to the Laser Beam-1, photodiode 114, and the Laser Beam-2. The couplers 112, 116, and 118 may include 1×2 couplers as shown in FIG. 1. For example, the coupler 112 provides fiber optic coupling for the transmission to the modulator 108 and the coupler 116. The coupler 112 may be designated as a 90/10 coupler, where 90% of the laser beam is directed to the modulator 108, and 10% of the laser beam is directed to the photodiode 114. Coupler 116 may be designated as a 50/50 coupler, and coupler 118 may be designated as a 90/10 coupler.

A circulator 120 may be intermediately disposed between the modulator 108 and the optical fiber 110. The circulator 120 may receive the amplified laser beam from the modulator 108, and direct the amplified laser beam to the optical fiber 110. Further, the circulator 120 may receive the backscattered signal from the optical fiber 110.

A polarization beam splitter (PBS) 122 may be used to receive the backscattered signal from the optical fiber 110 via the circulator 120. The PBS 122 may separate the backscatter signal into two different polarization beams. That is, because the backscattered light from the optical fiber 110 is at an unknown polarization state, the PBS 122 may divide the backscattered light into two polarization states. The polarization states may represent projections over two polar states. The two polar sates may represent S-polarized light and P-polarized light. The S-polarization refers to light that is polarized perpendicularly to the plane of incidence. The P-polarization refers to light that is polarized parallel to the plane of incidence.

A PBS 124 may be used to receive the Laser Beam-2. The PBS 124 may separate the Laser Beam-2 into two different polarization beams.

Output from the PBS 122 may be separated between splitters 126 and 128. At splitter 126, S-polarized light may be mixed with the S-polarized Laser Beam-2. At splitter 128, P-polarized light may be mixed with the P-polarized Laser Beam-2.

The outputs from the splitters 126 and 128 may be directed to photodiodes. The splitters 126 and 128 may include 2×2 splitters. The splitters 126 and 128 may be 50/50 splitters where 50% of the backscattered signal and 50% of the laser beam at the correct polarization is directed to the corresponding photodiodes.

A sensor controller 130 may operate in conjunction with a coherent receiver 132 to determine the Brillouin trace and the Rayleigh trace as disclosed herein. The coherent receiver 132 may include the PBS 122, the PBS 124, the splitters 126 and 128, and the photodiodes.

The Rayleigh trace or the Brillouin trace may represent the temporal evolution of optical power at the corresponding optical frequency or range of frequencies, acquired synchronously after each pulse. The electrical signals generated by the photodiodes of the coherent receiver 132 may reflect beat frequencies of the backscattered fields with the local oscillator. The bandwidth of the photodiodes of the coherent receiver 132, electrical amplification, and analogue to digital conversion may set some frequency limits to the optical signals that may be acquired. The accessible optical frequency range is then comprised between the frequency of the optical oscillation plus or minus a global electrical bandwidth. The electrical signals generated by the photodiodes of the coherent receiver 132 may be processed to further reduce the range of accessible frequencies, for example, by analogue or digital filters, which may be low-pass and band-pass filters. The electrical signals generated by the photodiodes of the coherent receiver 132 are proportional to the field of the optical backscattered signal, and may be processed by analogue or digital techniques in order to determine a power. For example a digital squaring and averaging procedure may yield the effective power.

With respect to the Brillouin trace, the Laser Beam-1 and the Laser Beam-2 may be set to an offset frequency shift within a range of approximately 10.0 GHz-13.0 GHz. For example, the Laser Beam-1 and the Laser Beam-2 may be set to approximately 10.8 GHz offset frequency shift. With such a value of the frequency shift, a coherent detection at low frequencies (e.g., around zero frequency) may yield the Brillouin trace. In this regard, a low-pass filter may be used with respect to the Brillouin trace determination.

With respect to the Rayleigh trace, the Laser Beam-1 and the Laser Beam-2 may be set with an offset frequency shift. The coherent detection at this same frequency yields the Rayleigh trace. For example, with respect to the Rayleigh trace, the Laser Beam-1 and the Laser Beam-2 may be set to an offset frequency shift within a range of approximately 100.0 KHz to approximately 1.0 GHz. According to an example, with respect to the Rayleigh trace, the Laser Beam-1 and the Laser Beam-2 may be set to an offset frequency shift of approximately 240 MHz. In this regard, a band-pass filter may be used with respect to the Rayleigh trace determination.

Operation of the sensor 100 for Brillouin trace determination is described with reference to FIG. 1.

With respect to Brillouin trace determination, the sensor 100 may maintain a predetermined offset frequency shift between the Laser Beam-1 and the Laser Beam-2. For example, the Laser Beam-1 and the Laser Beam-2 may be set to approximately 10.8 GHz offset frequency shift. For example, the Laser Beam-1 may be set to a predetermined frequency of 193 THz and an offset frequency shift of 10.8 GHz, and the Laser Beam-2 may be set to the predetermined frequency of approximately 193 THz. When the Laser Beam-1 and the Laser Beam-2 are shifted at a high frequency of approximately 10.8 GHz, the backscattered light returning from the optical fiber 110 is approximately at a frequency of the Laser Beam-2, which provides for Brillouin detection.

The Laser Beam-1 may be modulated with the modulator 108.

The modulated Laser Beam-1 may be injected into the DUT, For the example of FIG. 1, the DUT may include the optical fiber 110.

The backscattered signal from the optical fiber 110 may be acquired with the coherent receiver 132. At the coherent receiver 132, the Laser Beam-2 may be used as a local oscillator.

The acquisitions of the backscattered signal may be repeated for various frequency shifts between the two laser beams in order to sample the distributed Brillouin spectra. For example, assuming that a Brillouin trace is determined at approximately 10.8 GHz, the acquisitions may be acquired for various frequency shifts in the range of approximately 10.7 GHz to 10.9 GHz in increments of 1.0-10.0 MHz.

A coherent detection at low frequencies (e.g., around zero frequency), with laser beam frequency shift set at 10.8 GHz yields the Brillouin trace.

The resonant Brillouin frequency shift along the optical fiber 110 may be determined from the distributed Brillouin spectra. The resonant Brillouin frequency shift along the optical fiber 110 may be determined by fitting the distributed Brillouin spectra. Further, the integrated Brillouin power may be determined from the distributed Brillouin spectra. For example, the integrated Brillouin power may be determined from the distributed Brillouin spectra by applying an integration operation to the distributed Brillouin spectra. The resonant Brillouin frequency shift along the optical fiber 110 and the integrated Brillouin power may be used to determine the mechanical strain and temperature along the optical fiber 110.

Operation of the sensor 100 for Rayleigh trace determination is described with reference to FIG. 1.

With respect to the Rayleigh trace determination, for the sensor 100, the Laser Beam-1 and the Laser Beam-2 may be scanned over a wavelength range with a maintained frequency shift between the two laser beams. With respect to the Rayleigh trace determination, the offset frequency shift may include frequencies within a range of approximately 100.0 KHz to approximately 1 GHz. For example, the Laser Beam-1 and the Laser Beam-2 may be set to a predetermined frequency of approximately 193 THz, with a 240 MHz offset frequency shift specified for the Laser Beam-1. Thus, at low frequency shifts, the Rayleigh trace may be determined. The scanning of the Laser Beam-1 and the Laser Beam-2 over a wavelength range with a maintained frequency shift between the two laser beams may be used to continuously tune the laser sources for the Laser Beam-1 and the Laser Beam-2.

The Laser Beam-1 may be modulated with the modulator 108,

The modulated Laser Beam-1 may be injected into the DUT. For the example of FIG. 1, the DUT may include the optical fiber 110.

The backscattered signal from the optical fiber 110 may be acquired with the coherent receiver 132. At the coherent receiver 132, the Laser Beam-2 may be used as a local oscillator.

The acquisitions of the backscattered signal may be repeated at the same predetermined offset frequency shift. For the Rayleigh traces the repeated acquisitions may be averaged while scanning the two laser beams in order to reduce coherent fading noises. Thus the coherent detection at the offset frequency shift yields the Rayleigh trace, where the range of possible frequencies includes approximately 100.0 KHz to approximately 1 GHz. The Rayleigh trace may represent the Rayleigh power as function of time or distance along the optical fiber 110.

Figure 2A:
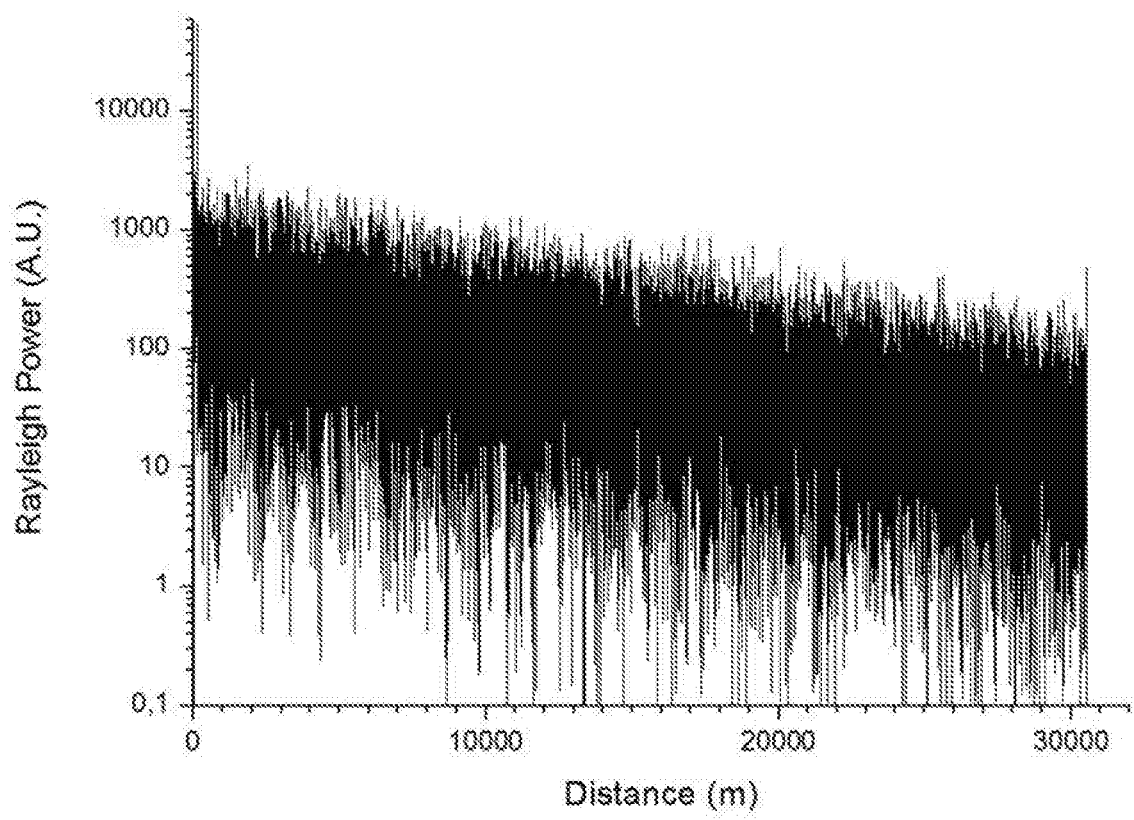
FIGS. 2A-2C respectively illustrate coherent fading noise for Rayleigh power without tuning, with a 4 nm scan, and with a 35 nm scan, each performed at a 10 ns pulse with 1 m spatial resolution, according to an example of the present disclosure.
Figure 2B:
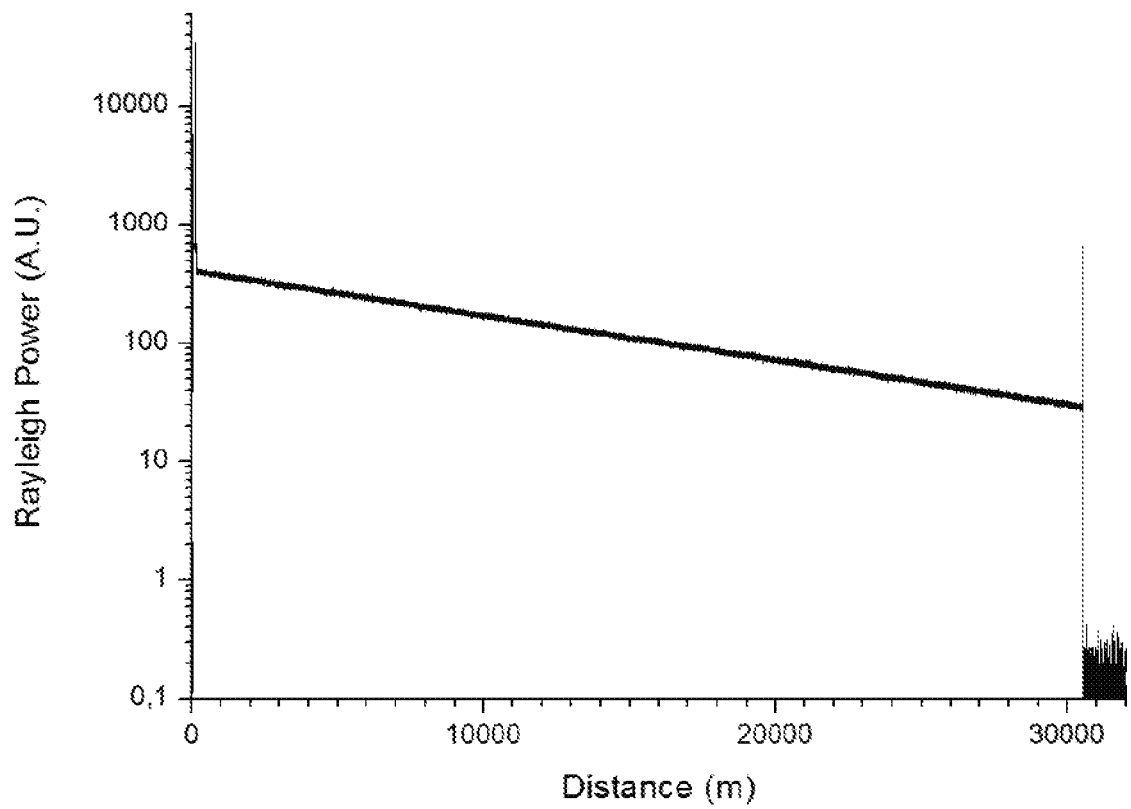
Figure 2C:
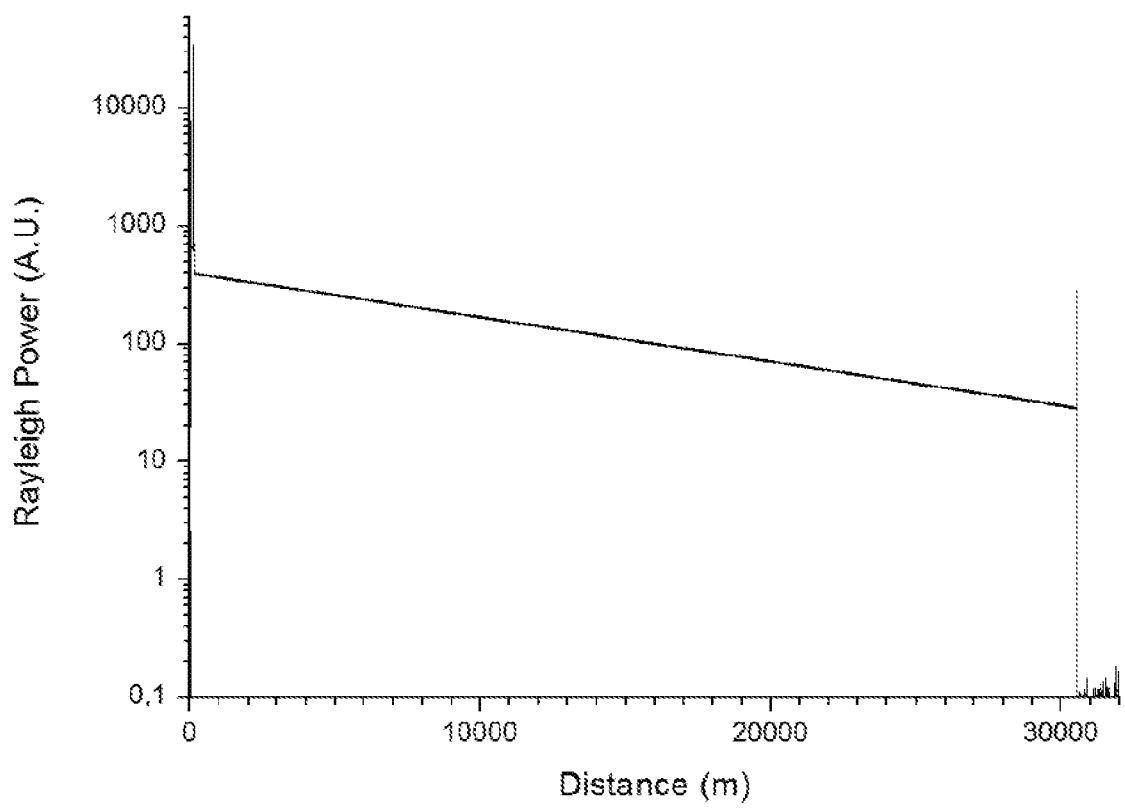

With respect to the determination of Rayleigh power, FIGS. 2A-2C respectively illustrate coherent fading noise for Rayleigh power without tuning, with a 4 nm scan, and with a 35 nm scan, each performed at a 10 ns pulse with 1 m spatial resolution, according to an example of the present disclosure. As shown in FIGS. 2A-2C, use of a broadband source or the frequency sweep of a narrow source reduces interferences, which are observable as noise and referred to as coherent fading noise.

Based on the determination of the Brillouin power and the Rayleigh power, the sensor 100 provides for temperature and strain determination at high spatial resolution. As disclosed herein, the Brillouin power may be determined based on the B-OTDR functionality of the sensor 100, and the Rayleigh power may be determined based on the OTDR functionality of the sensor 100. In this regard, the B-OTDR functionality of the sensor 100 provides for measurement of the Brillouin frequency shift and the Brillouin power. The Brillouin power may be normalized to the Rayleigh power to remove the power variations associated with fiber loss. In this regard, the Brillouin power may be normalized to the Rayleigh power by dividing the Brillouin power with respect to the Rayleigh power.

With respect to coarse tuning of the laser sources for the Laser Beam-1 and the Laser Beam-2, for each of the laser beams, chip temperature of the laser source chip may be used for coarse tuning. A table of chip temperatures may be used as a guide to determine tuning values for the laser sources of the Laser Beam-1 and the Laser Beam-2. With respect to fine tuning of the laser sources for the Laser Beam-1 and the Laser Beam-2, for each of the laser sources, laser source chip operating current may be used for fine tuning. That is, with respect to the Brillouin and Rayleigh trace determination, the chip temperature and the laser source chip operating current may be used to control the offset frequency shift between the Laser Beam-1 and the Laser Beam-2.

A feedback loop on chip temperature and operating current may be applied between the Laser Beam-1, the Laser Beam-2, and the photodiode 114, to maintain a constant beat frequency for the Laser Beam-1 and the Laser Beam-2. In this regard, the beat frequency of the laser beams may be maintained as needed based on a determination of chip temperature and operating current of the laser sources.

The frequency of the beat frequency produced on a fast photodiode is evaluated with a counter of zero-crossings per unit time. In this regard, one technique for determining an offset frequency shift associated with a laser beam is to count the zero-crossings. For example, a comparator with a zero level may be used to determine each time the zero level is crossed. Based on the number of times the zero level is crossed, the offset frequency shift associated with a laser beam may be determined.

In order to maintain the backscattered signal within the radio frequency (RF) bandwidth of the coherent detection scheme, stabilization should be sufficiently efficient. In this regard, with respect to tuning of a laser source, 1 MHz of frequency may correspond to 1° C. of temperature change. According to an example, the RF bandwidth of the detection may be specified at 1 MHz or greater. In order to achieve high spatial resolution, a relatively large detection bandwidth may be utilized. For example, with respect to the detection, a low-pass filter may be used with respect to the Brillouin trace determination, and a band-pass filter may be used with respect to the Rayleigh trace determination. A RF bandwidth lower than 1 MHz may equate to a spatial resolution greater than 100 m, which may not be relevant with respect to distributed sensing.

For Rayleigh scattering applications including OTDR, if narrower bandwidth is needed, a narrower but tunable RF filter locked to maximize the coherent signal may be used. Alternatively, the coherent signal may be demodulated by mixing the output of the photodiode 114 with the output of the coherent detection at the photodiodes for the coherent receiver 132.

In order to synchronize the simultaneous sweep of the Laser Beam-1 and the Laser Beam-2 to maintain a constant beat frequency, a variation curve of the two laser beam frequencies versus temperature may be determined. In this regard, the variation curve may be used to calibrate the laser sources for the Laser Beam-1 and the Laser Beam-2. Further, as described herein, a feedback loop may be maintained between the laser sources on the operating current and the photodiode 114 for fine frequency difference adjustments.

With respect to the sweep of the Laser Beam-1 and the Laser Beam-2 to maintain a constant beat frequency, sweep may be performed while the OTDR acquisitions are processed and averaged. The OTDR acquisitions may be processed and averaged by using a matrix of DFBs covering C-Band. A first matrix of DFBs may be used for Laser Beam-1, and a second matrix of DFBs may be used for Laser Beam-2.

FIGS. 3 and 4 respectively illustrate flowcharts of methods 300 and 400 for Brillouin trace and Rayleigh trace determination, according to examples. The methods 300 and 400 may be implemented on the Brillouin and Rayleigh distributed sensor described above with reference to FIGS. 1-20 by way of example and not limitation. The methods 300 and 400 may be practiced in other systems.

Referring to FIGS. 1-3, and particularly FIG. 3, at block 302, the method 300 may include maintaining a predetermined offset frequency shift between the Laser Beam-1 (e.g., first laser beam) and the Laser Beam-2 (e.g., second laser beam). The predetermined offset frequency shift may be relative to a predetermined frequency of either the Laser Beam-1 or the Laser Beam-2. For example, referring to FIG. 1, the photodiode 114 may acquire a beat frequency between the first laser beam and the second laser beam, where the beat frequency is used to maintain a predetermined offset frequency shift between the Laser Beam-1 and the Laser Beam-2.

At block 304, the method 300 may include modulating the Laser Beam-1. The modulated Laser Beam-1 is to be injected into the DUT. For example, referring to FIG. 1, the modulator 108 may modulate the Laser Beam-1. The DUT may include the optical fiber 110.

At block 306, the method 300 may include acquiring a backscattered signal from the DUT. The backscattered signal results from the modulated Laser Beam-1 injected into the DUT. The Laser Beam-2 may be used as a local oscillator. For example, referring to FIG. 1, the coherent receiver 132 may acquire a backscattered signal from the DUT.

At block 308, the method 300 may include determining, based on the acquired backscattered signal from the DUT, a Brillouin trace for the DUT. For example, referring to FIG. 1, the sensor controller 130 may operate in conjunction with the coherent receiver 132 to determine a Brillouin trace for the DUT.

According to examples, the method 300 may further include repeating the acquisition of the backscattered signal from the DUT for a plurality of frequency shifts. For example, assuming that a Brillouin trace is determined at approximately 10.8 GHz, the acquisitions may be acquired for various frequency shifts in the range of approximately 10.7 GHz to 10.9 GHz in increments of 1.0 MHz-10.0 MHz. The method 300 may include sampling, based on the repeated acquisitions corresponding to the plurality of frequency shifts and the acquisition of the backscattered signal from the DUT, a distributed Brillouin spectra. The method 300 may include determining, based on the sampling of the distributed Brillouin spectra, a resonant Brillouin frequency shift along the DUT.

According to examples, the method 300 may further include determining, based on the sampling of the distributed Brillouin spectra, integrated Brillouin power by performing an integration operation with respect to the resonant Brillouin frequency shift.

According to examples, the method 300 may further include scanning the Laser Beam-1 and the Laser Beam-2 over a wavelength range with a different predetermined offset frequency shift between the two laser beams. For example, the different predetermined offset frequency shift may be approximately 240 MHz. The method 300 may include further modulating the Laser Beam-1 associated with the different predetermined offset frequency shift. The further modulated Laser Beam-1 is to be injected into the DUT. The method 300 may include further acquiring a further backscattered signal from the DUT. The further backscattered signal may be based on the further modulated Laser Beam-1 injected into the DUT. The Laser Beam-2 is to be used as the local oscillator. The method 300 may include determining, based on the further acquired backscattered signal from the DUT, a Rayleigh trace for the DUT. The Rayleigh trace may represent the Rayleigh power as function of time or distance along the optical fiber 110.

According to examples, the method 300 may further include determining, based on the integrated Brillouin power, the Rayleigh power, and the resonant Brillouin frequency shift along the DUT, temperature and strain associated with the DUT.

Referring to FIGS. 1-20 and 4, and particularly FIG. 4, at block 402, the method 400 may include scanning the Laser Beam-1 (e.g., first laser beam) and the Laser Beam-2 (e.g., second laser beam) over a wavelength range with a predetermined offset frequency shift between the two laser beams. For example, referring to FIG. 1, the photodiode 114 may acquire a beat frequency between the first laser beam and the second laser beam, where the beat frequency is used to maintain a predetermined offset frequency shift between the Laser Beam-1 and the Laser Beam-2. The predetermined offset frequency shift is relative to a predetermined frequency of either the Laser Beam-1 or the Laser Beam-2.

At block 404, the method 400 may include modulating the Laser Beam-1. For example, referring to FIG. 1, the modulator 108 may modulate the Laser Beam-1. The modulated Laser Beam-1 is to be injected into the DUT.

At block 406, the method 400 may include acquiring a backscattered signal from the DUT. The backscattered signal results from the modulated Laser Beam-1 injected into the DUT. The Laser Beam-2 is to be used as a local oscillator. For example, referring to FIG. 1, the coherent receiver 132 may acquire a backscattered signal from the DUT.

At block 408, the method 400 may include determining, based on the acquired backscattered signal from the DUT, a Rayleigh trace for the DUT. For example, referring to FIG. 1, the sensor controller 130 may operate in conjunction with the coherent receiver 132 to determine a Rayleigh trace for the DUT.

According to examples, the method 400 may further include repeating the acquisition of the backscattered signal from the DUT for the predetermined offset frequency shift. The method 400 may include averaging, during scanning of the Laser Beam-1 and the Laser Beam-2 over the wavelength range with the predetermined offset frequency shift between the two laser beams, the repeated acquisitions of the backscattered signal from the DUT for the predetermined offset frequency shift to reduce coherent fading noises.

According to examples, the method 400 may further include maintaining a different predetermined offset frequency shift between the Laser Beam-1 and the Laser Beam-2. For example, the different predetermined offset frequency shift may be approximately 10.8 GHz. The method 400 may include further modulating the Laser Beam-1 associated with the different predetermined offset frequency shift. The further modulated Laser Beam-1 is to be injected into the DUT. The method 400 may include further acquiring a further backscattered signal from the DUT. The further backscattered signal is based on the further modulated Laser Beam-1 injected into the DUT. The Laser Beam-2 is to be used as the local oscillator. The method 400 may include determining, based on the further acquired backscattered signal from the DUT, a Brillouin trace for the DUT.

According to examples, the method 400 may further include determining, based on the Brillouin trace, Brillouin power associated with the DUT. The method 400 may include normalizing the Brillouin power with respect to the Rayleigh power to remove power variations associated with the DUT. The method 400 may include determining, based on the normalized Brillouin power and a resonant Brillouin frequency shift along the DUT, temperature and strain associated with the DUT.

Figure 5:
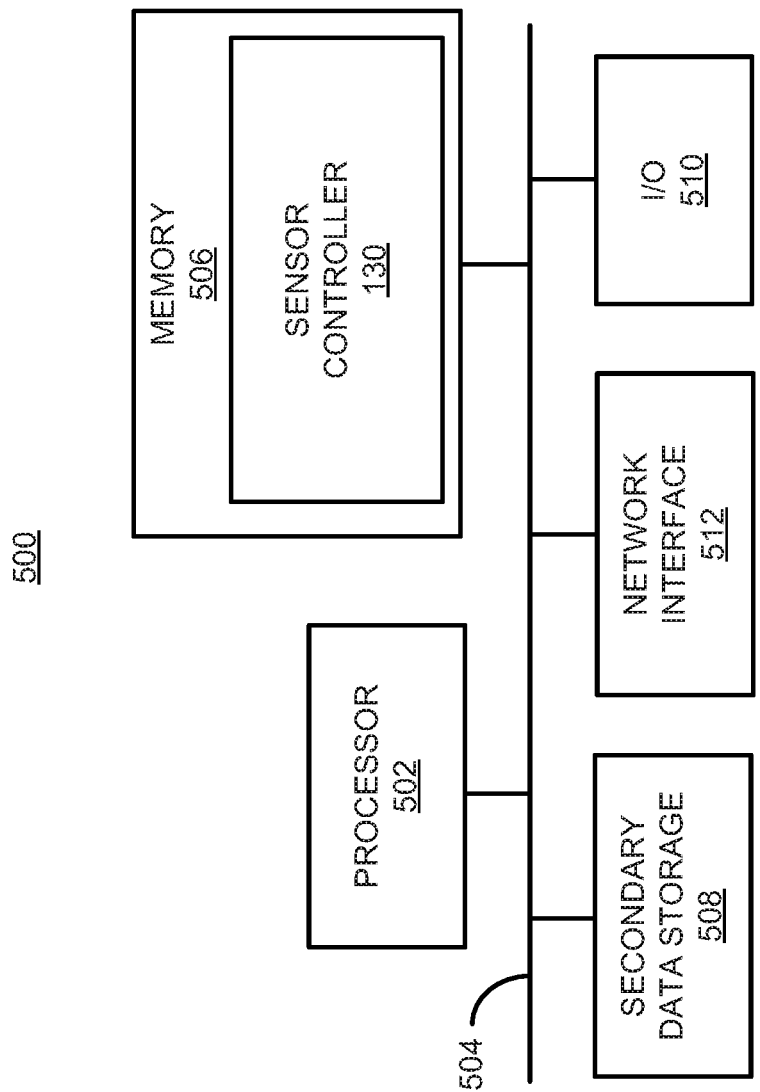
FIG. 5 illustrates a computer system, according to an example of the present disclosure.

FIG. 5 shows a computer system 500 that may be used with the examples described herein. The computer system may represent a generic platform that includes components that may be in a server or another computer system. The computer system 500 may be used as part of a platform for the sensor controller 130. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions and other processes described herein. Commands and data from the processor 502 may be communicated over a communication bus 504. The computer system may also include a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include the sensor controller 130 including machine readable instructions residing in the memory 506 during runtime and executed by the processor 502.

The computer system 500 may include an I/O device 510, such as a keyboard, a mouse, a display, etc. The computer system may include a network interface 512 for connecting to a network. Other known electronic components may be added or substituted in the computer system.

The processor 502 may be designated as a hardware processor. The processor 502 may execute operations associated with various components of the Brillouin and Rayleigh distributed sensor 100. For example, the processor 502 may execute operations associated with the sensor controller 130, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A Brillouin and Rayleigh distributed sensor comprising:
    a first laser source to emit a first laser beam;
    a second laser source to emit a second laser beam;
    a photodiode to acquire a beat frequency between the first laser beam and the second laser beam, wherein the beat frequency is used to maintain a predetermined offset frequency shift between the first laser beam and the second laser beam, wherein the predetermined offset frequency shift is relative to a predetermined frequency of either the first laser beam or the second laser beam;
    a modulator to modulate the first laser beam, wherein the modulated first laser beam is to be injected into a device under test (DUT);
    a coherent receiver, disposed separately from the photodiode, to acquire a backscattered signal from the DUT, wherein the backscattered signal results from the modulated first laser beam injected into the DUT, and wherein the coherent receiver is to use the second laser beam as a local oscillator to determine, based on the acquired backscattered signal, Brillouin and Rayleigh traces with respect to the DUT based on the predetermined offset frequency shift between the first laser beam and the second laser beam by further using
        a polarization beam splitter (PBS) of the coherent receiver to
            receive the backscattered signal, and
            divide the backscattered signal into two different polarization states including a first polar state and a second polar state that are the same as first and second polar states of the second laser beam, wherein a divided portion of the backscattered signal corresponding to the first polar state is to be mixed with the second laser beam at the first polar state, and a divided portion of the backscattered signal corresponding to the second polar state is to be mixed with the second laser beam at the second polar state to determine the Brillouin and Rayleigh traces with respect to the DUT;
    a processor; and
    a non-transitory computer readable medium storing machine readable instructions that when executed by the processor cause the processor to:
        determine, based on the Brillouin and Rayleigh traces, temperature and strain associated with the DUT.

2. The Brillouin and Rayleigh distributed sensor of claim 1, wherein the predetermined offset frequency shift for determination of the Brillouin trace is approximately 10.8 GHz.

3. The Brillouin and Rayleigh distributed sensor of claim 1, wherein the predetermined offset frequency shift for determination of the Brillouin trace is selected from a range of approximately 10.0 GHz to approximately 13.0 GHz.

4. The Brillouin and Rayleigh distributed sensor of claim 1, wherein the predetermined offset frequency shift for determination of the Rayleigh trace is selected from a range of approximately 100.0 KHz to approximately 1.0 GHz.

5. The Brillouin and Rayleigh distributed sensor of claim 1, wherein the DUT is an optical fiber.

6. A method for Brillouin trace and Rayleigh trace determination, the method comprising:
    maintaining, based on a beat frequency acquired by a photodiode and between a first laser beam and a second laser beam, a predetermined offset frequency shift between the first laser beam and the second laser beam, wherein the predetermined offset frequency shift is relative to a predetermined frequency of either the first laser beam or the second laser beam;
    modulating the first laser beam, wherein the modulated first laser beam is to be injected into a device under test (DUT);
    acquiring, by a coherent receiver disposed separately from the photodiode, a backscattered signal from the DUT, wherein the backscattered signal results from the modulated first laser beam injected into the DUT, and wherein the second laser beam is to be used as a local oscillator;
    determining, based on the acquired backscattered signal from the DUT, a Brillouin trace for the DUT;
    repeating the acquisition of the backscattered signal from the DUT for a plurality of frequency shifts;
    sampling, based on the repeated acquisitions corresponding to the plurality of frequency shifts and the acquisition of the backscattered signal from the DUT, a distributed Brillouin spectra;

determining, based on the sampling of the distributed Brillouin spectra, a resonant Brillouin frequency shift along the DUT; and determining, based on the sampling of the distributed Brillouin spectra, integrated Brillouin power by performing an integration operation with respect to the resonant Brillouin frequency shift.

7. The method for Brillouin trace and Rayleigh trace determination according to claim 6, further comprising:

determining, based on the integrated Brillouin power, Rayleigh power, and the resonant Brillouin frequency shift along the DUT, temperature and strain associated with the DUT.

8. The method for Brillouin trace and Rayleigh trace determination according to claim 6, wherein the DUT is an optical fiber.

9. The method for Brillouin trace and Rayleigh trace determination according to claim 6, wherein the predetermined offset frequency shift for determination of the Brillouin trace is approximately 10.8 GHz.

10. The method for Brillouin trace and Rayleigh trace determination according to claim 6, wherein the predetermined offset frequency shift for determination of the Brillouin trace is selected from a range of approximately 10.0 GHz to approximately 13.0 GHz.

11. A method for Brillouin trace and Rayleigh trace determination, the method comprising:

scanning a first laser beam and a second laser beam over a wavelength range with a predetermined offset frequency shift between the two laser beams, wherein the predetermined offset frequency shift is relative to a predetermined frequency of either the first laser beam or the second laser beam, and wherein the predetermined offset frequency shift between the two laser beams is based on a beat frequency acquired by a photodiode;

modulating the first laser beam, wherein the modulated first laser beam is to be injected into a device under test (DUT);

acquiring, by a coherent receiver disposed separately from the photodiode, a backscattered signal from the DUT, wherein the backscattered signal results from the modulated first laser beam injected into the DUT, and wherein the second laser beam is to be used as a local oscillator;

determining, based on the acquired backscattered signal from the DUT, a Rayleigh trace for the DUT;

determining a Brillouin trace for the DUT;

determining, based on the Rayleigh trace and the Brillouin trace, Rayleigh power and Brillouin power;

normalizing the Brillouin power with respect to the Rayleigh power to remove power variations associated with the DUT; and determining, based on the normalized Brillouin power and a resonant Brillouin frequency shift along the DUT, temperature and strain associated with the DUT.

12. The method for Brillouin trace and Rayleigh trace determination according to claim 11, further comprising:

repeating the acquisition of the backscattered signal from the DUT for the predetermined offset frequency shift; and averaging, during scanning of the first laser beam and the second laser beam over the wavelength range with the predetermined offset frequency shift between the two laser beams, the repeated acquisitions of the backscattered signal from the DUT for the predetermined offset frequency shift to reduce coherent fading noises.

13. The method for Brillouin trace and Rayleigh trace determination according to claim 11, wherein the predetermined offset frequency shift is selected from a range of approximately 100.0 KHz to approximately 1.0 GHz.

14. The method for Brillouin trace and Rayleigh trace determination according to claim 11, wherein the DUT is an optical fiber.

* * * * *